(12) United States Patent  (10) Patent No.: US 8,560,599 B2
Hatami-Hanza  (45) Date of Patent: Oct. 15, 2013

(54) AUTOMATIC CONTENT COMPOSITION GENERATION

(75) Inventor: Hamid Hatami-Hanza, Thornhill (CA)

(73) Assignee: Hamid Hatami-Hanza, Thornhill, Ontario (CA)

(*) Notice: Subject to any disclaimer, the term of this patent is extended or adjusted under 35 U.S.C. 154(b) by 314 days.

(21) Appl. No.: 12/946,838

(22) Filed: Nov. 15, 2010

(65) Prior Publication Data

US 2011/0125837 A1    May 26, 2011

Related U.S. Application Data

(60) Provisional application No. 61/263,685, filed on Nov. 23, 2009.

(51) Int. Cl.
*G06F 17/30* (2006.01)
*G06F 15/16* (2006.01)

(52) U.S. Cl.
USPC ............................................. 709/203

(58) Field of Classification Search
USPC ............... 709/203, 204, 205; 715/700–866; 707/706–708, 711, 713–716, 736–738
See application file for complete search history.

(56) References Cited

U.S. PATENT DOCUMENTS

| 7,496,593 B2* | 2/2009 | Gardner et al. ............... 1/1 |
| 8,041,702 B2* | 10/2011 | Eggebraaten et al. ....... 707/708 |
| 2003/0028500 A1* | 2/2003 | Jameson ..................... 706/45 |
| 2009/0030897 A1* | 1/2009 | Hatami-Hanza ............. 707/5 |

* cited by examiner

*Primary Examiner* — Ruolei Zong

(57) ABSTRACT

The invention discloses methods, algorithms, and the related systems and services of generating contents from a body of knowledge.

35 Claims, 8 Drawing Sheets

AUTOMATIC CONTENT COMPOSITION GENERATION

PRIOR US APPLICATION

This application claims priority from U.S. provisional patience patent application No. 61/263,685 filed on Nov. 23, 2009, entitled "Automatic Content Composition Generation" which is incorporated herein by reference.

CROSS-REFERENCE TO RELATED APPLICATIONS

This application also cross-references the U.S. patent application entitled "System and Method For Value Significance Evaluation of Ontological Subjects of Networks and the Applications Thereof" filed on Nov. 3, 2010, application Ser. No. 12/939,112; and US patent application entitled "System and Method of Content Generation", filed on Oct. 20, 2010, application Ser. No. 12/908,856; and US patent application entitled "System And Method For A Unified Semantic Ranking Of Compositions Of Ontological Subjects And The Applications Thereof", filed on Apr. 7, 2010, application Ser. No. 12/755,415; and US patent application entitled "System and Method of Ontological Subject Mapping for knowledge Processing Applications" filed on Aug. 26, 2009, application Ser. No. 12/547,879; and US patent application entitled "Assisted Knowledge Discovery and Publication System, and Method" filed on Jul. 24, 2008, application Ser. No. 12/179,363, which are incorporated herein by references along with their contents.

FIELD OF INVENTION

This invention generally relates to content generation, knowledge and information processing, ontological subject processing, web content service provider.

BACKGROUND OF THE INFORMATION

Currently human knowledge and the information produced by human in the forms of text, audio, video or multimedia contents are stored in vast repositories of corporate data centers, digital libraries, search engines, and storages of individual computer servers. The only effective tool at the disposal of a knowledge seeker professional for attaining knowledge or information is the service of search engines that provide a great many number of webpages and documents related to a keyword and a subject matter. The researchers have to still sift through countless documents to gain an obscure view of a body of knowledge related to his/her subject matter of interest. This process of knowledge seeking/acquisition needs highly trained professional, is very time consuming, slow, and expensive for both corporations and individuals. Moreover, there is no guarantee to the quality, value, and completeness of the knowledge gained from a human investigation of the body of knowledge related to a subject matter.

Therefore, having a representative content for a body of knowledge that can accurately show the essence and context of the body of knowledge can be beneficial. Composing the representative content by human is very slow, time consuming and needs highly trained professional authorities.

SUMMARY OF THE INVENTION

On the other hand, automatic content generation attempts, using Markov model or summarization techniques, have had a limited appeal since the results are not easy to read and comprehend by the users. Moreover there is no guarantee in terms of semantic significances of the automatically generated content to be used as a credible representative content for a body of knowledge.

Therefore, there exists a need to automatically generate quality contents without these shortcomings.

In this invention it is notice that the current automatic content generation method and systems are not able to preserve the context and substance nor can they represent the real significant essence of a body of knowledge.

This application is about solving the identified problem of generating authoritative or novel compositions (with the desired length) to adequately represent a body of knowledge or any important aspect of it by having a significant substance, knowledge significance, credibility, with the context coherency, usefulness, and sensibility for a knowledge seeker user.

According to one preferred exemplary embodiment the constituent components of the generated content composition are selected from the parts or partitions of one or more compositions or as we can call "the assembled body of knowledge" or simply "body of knowledge" in here. For instance a collection of WebPages are considered a body of knowledge, from which we desire to compose a new composition for using by a consumer. For this instance a plurality of web pages are obtained from a database after querying the database, e.g. a search engine database, and one desires to have a new composition built from or about the content of this plurality of WebPages so that a user can make sure to have the most appropriate and complete content, or in regards to a particular aspect, in hand which has almost the same information about a particular subject as the whole collection of WebPages returned by the search engine.

The generated content can be a long authoritative article with related multimedia content imbedded therein or being as short as a single sentence statement. Similarly, the body of knowledge can be any contents from a single paragraph article to longer compositions such as books or any sets of these kinds of compositions. Furthermore the body of knowledge or sets of composition can include any form of contents such as audio, video or multimedia, DNA codes, etc. However in explaining the exemplary embodiments and methods of this disclosure for the most part (for ease of explanation and familiarity) we use the textual compositions without intending any limitations on the applications of this disclosure to any other type of compositions.

The present method of composing new contents uses the methods and definitions as introduced in the patent application Ser. No. 12/939,112 to first evaluate the "Association strength matrix (ASM)", and "Value Significance Measures (VSMs)" of the ontological subjects, parts and partitions of the assembled body of knowledge. Having evaluated the VSMs of the ontological subjects, and/or the partitions, and the association strengths of the ontological subjects, the current disclosure discloses the methods and algorithms on how to compose a new content in a systematic manner. The resultant content will conserve the most important knowledge and relations of the original body of knowledge while having a coherent and logical path or the composing plan, route or map.

The method transforms the information of the usage and pattern of usage of ontological subjects of an input body of knowledge into matrices and the graphs or networks in accordance with the proposed defined matrices.

In this disclosure, we define the automatic composition generation in general as composing ontological subjects of any order and any nature (e.g., text, audio, video, genetic code, electrical signal etc.) The composition can specifically be composed of parts or partitions of other compositions such as using sentence, paragraphs or web pages obtained from larger compositions (i.e. higher order Ontological Subjects as defined in the patent application Ser. Nos. 12/755,415 and 12/939,112). Additionally a composition can be composed of different parts of larger compositions or higher order ontological subject with the same or different forms (e.g. text, video, audio, etc.) or any combination of them. Yet additionally the composition can be composed of ontological subjects or parts of larges compositions of specific form, e.g. text, transformed or trans-mapped into other forms of ontological subjects, e.g. video or movie, as described in the patent application Ser. No. 12/908,856, entitled "System and Method of Content Generation", filed on Oct. 20, 2010, which is also incorporated herein as reference.

To achieve or make a content composition of the above, a method of selecting the constituting components of the composition, along with the principal route or composing plan for composing the compositions out of ontological subjects is disclosed. It starts by having access to a collection of Ontological Subject of different orders and different natures (that are extracted from a body of knowledge). Then by employing one or more of the preferred algorithms a principal route for semantically composing the composition is determined and according to the route and based on the merit or values significances measures of the partitions, i.e. ontological subjects of lower and higher orders, most appropriate and merit-full partitions are selected to represent the intended semantics aspect according to said principal route of the composition. The route may be selected dynamically as the new content composition is being formed.

According to one exemplary embodiment of the invention, the method first follow the method of the patent application Ser. No. 12/939,112 to identify the most valuable partition of the body of knowledge by evaluating the value significance of the ontological subjects and/or the partitions as described in the patent application Ser. No. 12/939,112. The method may further construct a principal map of knowledge for that body of knowledge by evaluating the association strengths of the OSs of the given composition (e.g. a body of knowledge) and select a principal route or composing plan from which a new composition is being built. After identifying the principal route according to the predetermined requirements, style, aspect, application, etc. a new composition is constructed by selecting the most valued partitions of the body of knowledge that contain one or more of the associated OSs on the principal routs and explain the most significant OSs in such an order that will follow the principal rout or backbone of the composition. Depended on the allowed length or desirable length substantive details will be added based on their value significance measure/s and their relatedness or association with the OSs that need to be explained along the composition.

According to another aspect of this disclosure a method and the associated exemplary system is introduced that provide the knowledge consumers with the verified and substantive knowledge about a topic or subject matter of interest. For a given title or a query, question, keyword, or any given content etc., a body of knowledge or corpus is created or obtained. Using the summarization and clustering methods disclosed in referenced applications, the most semantically or formally important partitions of the corpus is identified for inclusion into the composed content. Using the principal maps and/or principal route/s, then the structure of the article (the content composition) is identified and organized. Once the structure of the article is identified for the semantics that need to be in the composition, then we find the best suited partitions to convey the necessary information about that semantic. Following the identified structure one can compose a coherent and comprehensible content which can be used by a human consumer or another software agent. The selected partitions can be further rephrased, edited, or replaced with semantically similar ontological subjects or parts if desired.

In essence, in this disclosure it is noticed that a document representing the collective knowledge of a diverse set of compositions containing information about a topic should first of all cover the most important aspects of the topic and its associated subtopics. Secondly it should contain the information according to the state of the collective knowledge and understating of the mass about that topic. Thirdly it should follow a logical path toward connecting the information about the knowledge therein so that it is easy for human to comprehend and follow the relations between the most important parts of the knowledge describing or analyzing or supporting a topic.

The methods, formulas, algorithms, the related systems and few exemplary applications will be explained in more details in the detailed description sections of the application.

DETAILED DESCRIPTION

Figure 1:
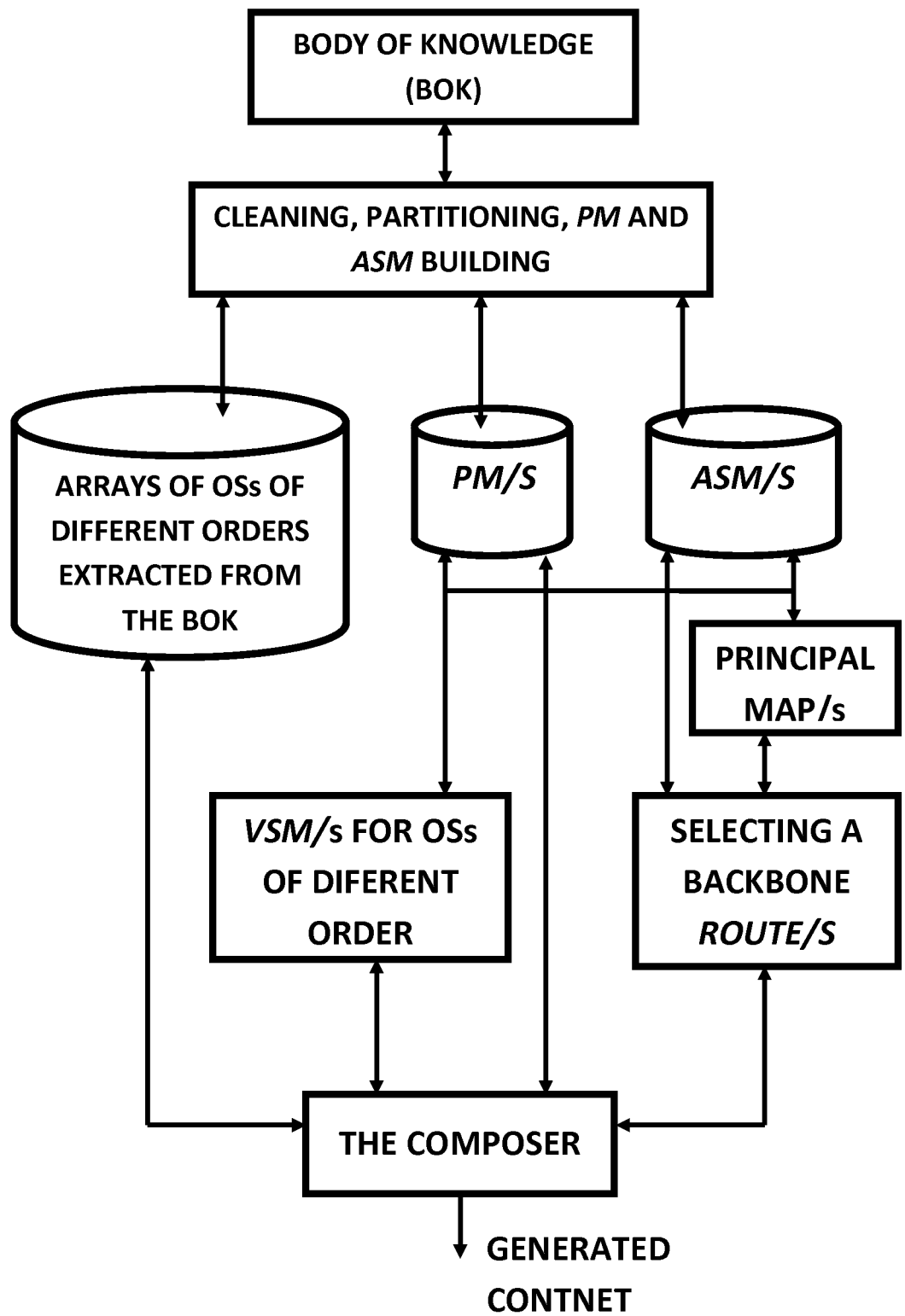
FIG. 1: shows schematically the block diagram of the process flow, method and system of generating content according to one exemplary embodiment of the invention.

Systems and methods of generating freelanced or classified quality contents for and from a body of knowledge are disclosed so as to speed up the process of research and development, knowledge acquisition, sharing, and real (verified) information retrieval.

In numerous situations, for example, authoritative content or article generation from a body of knowledge or a collection of compositions can be a desirable service or product. For instance, this is evidenced from the popularity of free encyclopedia of Wikipedia covering many numbers of subject matters of importance and interest. However, Wikipedia still uses a small group of people for each article making it notorious to errors and unverified facts. Moreover the capacity of content generation is limited due to the laborious process. Moreover, there are many more subject matters of importance and interests that are not covered there or are not up to date.

Therefore, an automatic system and method of generating contents which is fast and have no limitation on the capacity and the number of subject matters would be a highly valuable and effective service. However, automatic generation of valuable and complete contents using the vast repositories of contemporary knowledge is a vey challenging task.

It is also important to notice that generating a content requires the access to at least one body of knowledge (e.g. a dictionary at least, or an expert's knowledge). Therefore generating content cannot be viewed without having a body of knowledge at disposal. So far automatic content generation attempts, using Markov model or summarization techniques, have had a limited appeal since the results are not easy to read and comprehend by the users. That is because mostly they are focused on the natural language analysis of contents and the syntactical correctness of the generated contents using the words and word relationship statistics to synthesize the sentences and paragraphs and not necessarily the significance and correctness or credibility of the knowledge or semantics of the composed content from an input body of knowledge in a meaningful manner. Composing or generating content word by word or expression to expression does not guarantee the meaning and semantic coherency of the generated content due to the inherent ambiguity of natural languages and multiple word senses. Natural language analysis methods relay on the word roles and senses that are highly ambiguous and language dependent.

Hence, in other words, current automatic content generation method and systems are not able to preserve the context and substance of the input body of knowledge nor can they represent the real significant essence of the body of knowledge.

In the U.S. patent application Ser. Nos. 12/755,415 filed on Apr. 7, 2010 and 12/939,112 filed on Nov. 3, 2010 both by the same applicant, which are incorporated here as references, it was noticed and mentioned that many types of information processing services such as those of search engines, summarizers, question answering and the like are all a type of content generation from a body of contents or knowledge. Moreover, all these types of content generation can indeed be viewed or regarded as a form of summarization of large body of content to a number of partitions of an input corpus or composition.

Content generation therefore, in this view, is not a separate task from a summarization type involving the evaluation of the significance of the partitions of an input composition, as described in the U.S. patent application Ser. Nos. 12/939,112 and 12/755,415. Therefore, generating an authoritative content from a body of knowledge can also be done by using an efficient summarizations method to consolidate the true or conceived to be true information related to the topic. However, such summarizations based on value significance measures of the partitions of the input composition usually lack the coherency and continuity that is needed for an average reader to enjoy the benefits of such summarizations from a diverse set of compositions related to a topic of interest. In other words, though the summarized parts (employing the methods of application Ser. Nos. 12/939,112 and 12/755,415) are semantically important and have significant value in the context of that body of knowledge but a generated composition, in the form of listing the important partitions, may lack the coherency and a logical route necessary for better comprehension of the generated composition by an average user.

Therefore in this description methods and systems are given for generating contents (or compositions) having the necessary substance, knowledge, and knowledge route to adequately convoying the state of the knowledge about a subject matter.

Now the invention is disclosed in details in reference to the accompanying figures and exemplary cases and embodiments in the following subsections. The invention discloses the method, algorithms, and the related systems and services of generating content composition/s from a body of knowledge.

This disclosure uses the definitions that were introduced in the U.S. patent application Ser. No. 12/939,112, which is incorporated as a reference, and are recited here again along with more clarifying points according to their usage in this disclosure and the mathematical formulations herein.

I-Definitions

1. Ontological Subject: symbol or signal referring to a thing (tangible or otherwise) worthy of knowing about. Therefore Ontological Subject means generally any string of characters, but more specifically, characters, letters, numbers, words, bits, mathematical functions, sound signal tracks, video signal tracks, electrical signals, chemical molecules such as DNAs and their parts, or any combinations of them, and more specifically all such string combinations that indicates or refer to an entity, concept, quantity, and the incidences of such entities, concepts, and quantities. In this disclosure Ontological Subject's and the abbreviation OS or OSs are used interchangeably.

2. Ordered Ontological subjects: Ontological Subjects can be divided into sets with different orders depends on their length, attribute, and function. For instance, for ontological subjects of textual nature, one may characterizes letters as zeroth order OS, words as the first order, sentences as the second order, paragraphs as the third order, pages or chapters as the fourth order, documents as the fifth order, corpuses as the sixth order OS and so on. So a higher order OS is a combination or a set of lower order OSs or lower order OSs are members of a higher order OS. Equally one can order the genetic codes in different orders of ontological subjects. For instance, the 4 basis of a DNA molecules as the zeroth order OS, the base pairs as the first order, sets of pieces of DNA as the second order, genes as the third order, chromosomes as the fourth order, genomes as the fifth order, sets of similar genomes as the sixth order, sets of sets of genomes as the seventh order and so on. Yet the same can be defined for information bearing signals such as analogue and digital signals representing audio or video information. For instance for digital signals representing a video signal, bits (electrical One and Zero) can be defined as zeroth order OS, the bytes as first order, any sets of bytes as third order, and sets of sets of bytes, e.g. a frame, as fourth order OS and so on. Therefore definitions of orders for ontological subjects are arbitrary set of initial definitions that one should stick to in order to make sense of methods and mathematical formulations presented here and being able to interpret the consequent results or outcomes in more sensible and familiar language.

More importantly Ontological Subjects can be stored, processed, manipulated, and transported only by transferring, transforming, and using matter or energy (equivalent to matter) and hence the OS processing is a completely physical transformation of materials and energy.

3. Composition: is an OS composed of constituent ontological subjects of lower or the same order, particularly text documents written in natural language documents, genetic codes, encryption codes, data files, voice files, video files, and any mixture thereof. A collection, or a set, of compositions is also a composition. Therefore a composition is also an Ontological Subject which can be broken to lower order constituent Ontological Subjects. In this disclosure, the preferred exemplary composition is a set of data containing ontological subjects, for example a webpage, papers, documents, books, a set of webpages, sets of PDF articles, multimedia files, or simply words and phrases. Compositions are distinctly defined here for assisting the description in more familiar language than a technical language using only the defined OSs notations.

4. Partitions of composition: a partition of a composition, in general, is a part or whole, i.e. a subset, of a composition or collection of compositions. Therefore, a partition is also an Ontological Subject having the same or lower order than the composition as an OS. More specifically in the case of textual compositions, partitions of a composition can be chosen to be characters, words, sentences, paragraphs, chapters, webpage, etc. A partition of a composition is also any string of symbols representing any form of information bearing signals such as audio or videos, texts, DNA molecules, genetic letters, genes, and any combinations thereof. However our preferred exemplary definition of a partition of a composition in this disclosure is word, sentence, paragraph, page, chapters and the like, or WebPages, and partitions of a collection of compositions can moreover include one or more of the individual compositions. Partitions are also distinctly defined here for assisting the description in more familiar language than a technical language using only the general OSs definitions.

5. Value Significance Measure: assigning a quantity, or a number or feature or a metric for an OS from a set of OSs so as to assist the selection of one or more of the OSs from the set. More conveniently and in most cases the significance measure is a type of numerical quantity assigned to a partition of a composition. Therefore significance measures are functions of OSs and one or more of other related mathematical objects, wherein a mathematical object can, for instance, be a mathematical object containing information of participations of OSs in each other, whose values are used in the decisions about the constituent OSs of a composition.

6. Summarization: is a process of selecting one or more OS from one or more sets of OSs according to predetermined criteria with or without the help of value significance and ranking metric/s. The selection or filtering of one or more OS from a set of OSs is usually done for the purposes of representation of a body of data by a summary as an indicative of that body. Specifically, therefore, in this disclosure searching through a set of partitions or compositions, and showing the search results according to the predetermined criteria is considered a form of summarization. In this view finding an answer to a query, e.g. question answering, or finding a composition related or similar to an input composition etc. are also a form of searching through a set of partitions and therefore are a form of summarization according to the given definitions here.

7. Subject matter: generally is an ontological subject or a composition itself. Therefore subject matters and OSs have in principal the same characteristics and are not distinguishable from each other. Yet less generally and bit more specifically a subject matter (SM), in the preferred exemplary embodiments of this application, is a word or combination of a word that shows a repeated pattern in many documents and people or some groups of people come to recognize that word or combinatory phrase. Nouns and noun phrases, verbs and verb phrases, with or without adjectives, are examples of subject matters. For instance the word "writing" could be a subject matter, and the phrase "Good Writing" is also a subject matter. A subject matter can also be a sentence or any combination of number of sentences. They are mostly related, but not limited, to nouns, noun phrases, entities, and things, real or imaginary. But preferably almost most of the time is a keyword or set of keywords or topic or a title of interest.

8. Body of Knowledge: is a composition or set of compositions available or assembled from different sources. The body of knowledge can be related to one or more subject matter or just a free or random collection of compositions. The "Body of Knowledge" may be abbreviated from time to time as BOK in this application. The BOK can further include compositions of different forms for instance one part of an exemplary BOK can be a text and another part contains video, or picture, or a genetic code.

9. The usage of quotation marks " ": throughout the disclosure several compound names of variables, functions and mathematical objects (such as "participation matrix", "conditional occurrence probability" and the like) will be introduced that once or more is being placed between the quotation marks (" ") for identifying them as one object and must not be interpreted as being a direct quote from the literatures outside this disclosure (except the incorporated referenced patent applications). Furthermore the term "module" in this application means any part, section and/or piece/s of codes of a computer executable instruction program. Additionally the term "computer-readable storage medium" refers to all types of non-transitory computer readable media such as magnetic cassettes, flash memory cards, digital video discs, random access memories (RAMs), Bernoulli cartridges, read only memories (ROMs) and the like, with the sole exception being a transitory, propagating signal.

Now the invention is disclosed in details in reference to the accompanying figures and exemplary cases and embodiments in the following sub sections.

II-Description

The invention is now described in detailed disclosure accompanying by several exemplary embodiments of the system and its blocks according to the present invention.

Although the method is general with broad applications and implementation, the disclosure is described by way of specific exemplary embodiments to consequently describe the implications and applications in the simplest form embodiments and senses.

Without restriction intended for any form of contents such as text, audio, video, pictures and the like we start by describing the embodiments with regards to inputs as the body of knowledge in the form of text. However, for other forms of content the present methodology and process can be used once one considers that all types of contents are different realization of semantic representations of the universe. Therefore a semantic or knowledge representation transformation will make the current description applicable to all forms of contents and particularly all forms of electronic contents available.

Also since most of human knowledge and daily information production is recorded in the form of text (or it can be converted to text), the detailed description is focused on textual compositions to illustrate the teachings and the method and the system. In what follows the invention is described in several sections and steps which in light of the previous definitions would be sufficient for those ordinary skilled in the art to comprehend and implement the method and the systems and the applications.

Following the formulation introduced in the patent application Ser. No. 12/939,112 (especially EQ. 1-14) we proceed to evaluate the value significance measures (VSMs) of the lower order and higher order OSs of the input body of knowledge (BOK). For instance, the VSMs of the words and the VSMs of the sentences or paragraphs of the BOK can be calculated using the formulation and algorithm of the patent application Ser. No. 12/939,112.

However, in section II-I, a summarized version of the formulation which helps to explain the current inventions is recited here again. The complete formulation is found in the incorporated referenced applications. In section II-II, the composing method then is explained in reference to the accompanying figures and the formulation method in section II-I here.

II-I Participation Matrix, Association Strength, and Value Significance Measures Assuming we have a given composition of ontological subjects, e.g. an input text, the Participation Matrix (PM) is a matrix indicating the participation of each ontological subject in each partitions of the composition. In other words in terms of our definitions, PM indicate the participation of one or more lower order OS into one or more OS of higher or the same order. PM is the most important array of data in this disclosure containing the raw information from which many other important functions, information, features, and desirable parameters can be extracted. Without intending any limitation on the value of PM entries, in the preferred embodiments throughout most of this disclosure (unless stated otherwise) the PM is a binary matrix having entries of one or zero and is built for a composition or a set of compositions as the following:

1. break the composition to desired numbers of partitions. For example, for a text document we can break the documents into chapters, pages, paragraphs, lines, and/or sentences, words etc.,
2. identify the desired form, number, and order of the ontological subject of the composition by appropriate method such as parsing a text documents into its constituent words and phrases, sentences, etc.,
3. select a desired N number of OSs of order k and a desired M number of OSs of order l (these OSs are usually the partitions of the composition from the step 1) existing in the composition, according to certain predetermined criteria, and;
4. construct a N×M matrix in which the ith raw ($R_i$) is a vector, with dimension M, indicating the presence of the ith OS of order k, (often extracted from the composition under investigation), in the OSs of order l, (often extracted from the same or another composition under investigation), by having a nonzero value, and not present by having the value of zero. In the exemplary embodiments of this disclosure usually the nonzero value is one (i.e. making the vector $R_i$ a binary) for ease of explanation. However all the formulations and calculations can still be followed by those skilled in the art by placing any other desired nonzero value to show the presence of OSs of order k in the OSs of order I.

We call this binary matrix the Participation Matrix of the order kl ($PM^{kl}$) which can be shown as:

$$PM^{kl} = \begin{pmatrix} & OS_1^l & \cdots & OS_M^l \\ OS_1^k & pm_{11}^{kl} & \cdots & pm_{1M}^{kl} \\ \vdots & \vdots & \ddots & \vdots \\ OS_N^k & pm_{N1}^{kl} & \cdots & pm_{NM}^{kl} \end{pmatrix} \quad (1)$$

where $OS_i^l$ is the ith OS of the lth order, $OS_i^k$ is the ith OS of the kth order, extracted from the composition, and $PM_{ij}^{kl}=1$ if $OS_i^k$ have participated, i.e. is a member, in the $OS_j^l$ and 0 otherwise.

The association strengths play an important role in evaluation of some of the value significances of OSs of the compositions and, in fact, are entries of a new matrix called here the "Association Strength Matrix ($ASM^{k|l}$)" whose entries will be defined as the following:

$$asm_{ji}^{k|l} = c \frac{com_{ij}^{k|l}}{\left(\frac{iop_j^{k|l}}{iop_i^{k|l}}\right)} = c \frac{com_{ij}^{k|l} \cdot iop_i^{k|l}}{iop_j^{k|l}}, \quad i,j = 1 \ldots N, \quad (2)$$

where c is a predetermined constant or a predefined function of other variables in Eq. 2. However in this disclosure we can we conveniently consider the case where c=1.

In Eq. 2, $com_{ij}^{k|l}$ denotes the co-occurrences of $OS_i^k$ and $OS_j^k$ in the set of OSs of order l $OS^l$, and in fact are the entries of the Co-Occurrence Matrix ($COM^{k|l}$) that is given by:

$$COM^{k|l} = PM^{kl*}(PM^{kl}), \quad (3)$$

and the $iop_i^{k|l}$ and $iop_j^{k|l}$ are the "independent occurrence probability" of $OS_i^k$ and $OS_j^k$ respectively. The probability of independent occurrence is the "Frequency of Occurrences" ($FO_i^k$) i.e. the number of times an $OS^k$ has appeared in the composition or its partition, divided by the total number of occurrences of all the other OSs of the same order in the composition, or divided by the number of possible occurrences of an OS in the partitions. The "Independent Occurrence Probability (IOP)" therefore is given by:

$$iop_i^{k|l} = \gamma_n \cdot FO_i^k \quad (4)$$

wherein $\gamma_n$ is a normalization factor that is determined by the mathematical necessities in different situations. For example, when $iop_i^{k|l}$ refers to the independent probability of occurrence of $OS_i^k$ in the M partitions of the composition then $\gamma_n = 1/M$, wherein more than one occurrences of $OS_i^k$ in a partition is not counted. The frequency of occurrences can be obtained by counting the occurrences of OSs of the particular order in the composition or its partitions, e.g. counting the appearances of particular word in the set of $OS^l$, or more conveniently obtained from the main diagonal of $COM^{k|l}$, i.e. $com_{ii}^{k|l}$ or the self-occurrence.

It is important to notice that the association strength defined by Eq. 2, is not symmetric and generally $asm_{ji}^{k|l} \neq asm_{ij}^{k|l}$.

Following the formulation introduced in Ser. No. 12/939,112 (especially EQ. 3-14) one can proceed to evaluate the value significance measures (VSMs) of the lower order and higher order OSs of the input body of knowledge (BOK). For instance, the VSMs of the words and the VSMs of the sentences or paragraphs of the BOK can be calculated using the formulation and algorithm of the patent application Ser. No. 12/939,112. Moreover, other appropriate measures of significances other than those mentioned exemplary in the application Ser. No. 12/939,112 can be defined as functions of one or more of the exemplary VSMs or any other mathematical objects introduced in that application.

The value significance of higher order OSs, e.g. order l in here, can be evaluated either by direct value significance evaluation similar to lower order OSs, or can be derived from value significance of the participating lower orders into higher order. Conveniently one can use the $VSMx_i^{k|l}$ (x=1, 2 ... ) and the participation matrices to arrive at the $VSMx_i^{l|k}$ of higher order OSs or the partition of the composition as the followings:

$$VSMx_j^{l|k} = \Sigma_i VSMx_i^{k|l} * pm_{ij}^{kl} \quad (5).$$

Eq. (5) can also be written in its matrix form to get the whole vector of value significance measure of OSs of order l|k (l given k). i.e. $VSMx^{l|k}$, as a function of the participation matrix, $PM^{k|l}$, and the vector $VSMx^{k|l}$.

If required the scores of the partitions, calculated based on the $VSM^{k|l}$ of the choice, can further be scaled or normalized. For instance the score or the resultant VSM of a partition (i.e. the $VSM^{l|k}$ in Eq. 5) can be divided by the number of the OSs contained in the partition or by the total number of the characters used in the partitions etc. in order to have a "density value significance measures" of the partitions of the BOK.

II-II-Methods for Composing A New Content From A Bok

Having defined the pre-requisite variables, function, and matrices we now explain the process and method of composing new contents for and/or from a "body of knowledge (BOK)".

One preferred embodiment of the invention is now described in detailed in reference to the FIG. 1. Referring to FIG. 1 here, it shows schematically one embodiment of the block diagram of the system and algorithm of generating new compositions from a body of knowledge. The notations and abbreviations are common with the patent application Ser. Nos. 12/939,112 and 12/755,415.

As shown in the FIG. 1, the system has access to a body of knowledge. The body of knowledge can be a collection of compositions or a single composition. The body of knowledge can be assembled by querying a search engine and collect a desired number of documents related to query or the subject matter. In general the system have access or assembles a body of knowledge or a corpus related to one or more subject matter form the variety of repository sources that might be available to the system including all type of knowledge repositories, data bases etc.

For simplicity and easier comprehension of the system according to the present invention, we assume that our exemplary input body of knowledge is a written text or has been transformed to a written text. Then the corpus or the BOK (also called the input composition in this application and the references herein from time to time) is partitioned to a desired number of partitions of different length or preferably to syntactically correct semantic units (such as word, sentences, paragraphs, etc.). In the preferred method the input composition is parsed to its constituents, words as OS order 1, sentences as OS order 2, the paragraphs as OS order 3, and so on.

As shown in FIG. 1, the extracted OSs of different orders of the BOK are stored in arrays of suitable format and storage efficiency and ease of retrieval. The storage can be temporary or more permanent computer readable media, for having accessed by other programs or be used in other similar sessions.

Concurrently or consequently the desired number of Participation Matrix/es (PM/s), as was described in section II-I, are built and also stored for further use. Participation matrix can be stored numerically or by any other programming language objects such as dictionaries, lists, list of lists, cell arrays, databases or any array of data etc. which are essentially different representation forms of the data contained in the PM/s. It is apparent to those skilled in the art that the formulations, mathematical objects and the described methods can be implemented in various ways using different computer programming languages or software packages that are suitable to perform the methods and the calculations.

Moreover storage of any of the objects and arrays of data and the calculations needed to implemented the methods and the systems of this invention can be done through localized computing and storage media facilities or be distributed over a distributed computer facility or facilities, distributed databases, file systems, parallel computing facilities, distributed hardware nodes, distributed storage hubs, distributed data warehouses, distributed processing, cluster computing, storage networks, and in general any type of computing architectures, communication networks, storage networks and facilities capable of implementing the methods and the systems of this invention. In fact the whole system and method can be implemented and performed by geographically distant computer environments wherein one or more of the data objects and/or one or more of the operation and functions is stored or performed or processed in a geographically different location from other parts storing or performing or processing one or more of the data objects and/or one or more of the operations or functions of this disclosure.

Referring to FIG. 1 again, concurrent to making PM or consequently and by following the formulation of section II-I, and utilizing the algorithm and system of the patent application Ser. No. 12/939,112, the system builds the Association Strength Matrix/es (ASM/s) and also keep them in temporal or more permanent computer readable storage medium.

Having built at least one the PM/s and/or one of the ASM/s, system can proceed to evaluate at least one of the "Value Significance Measures (VSM/s)" of the partitions and OSs of the desired order from their usage and their pattern of participation in the input composition, as shown in the FIG. 1.

Having built the ASM, the system now can consider the ASM as an asymmetric directed graph as was explained in the patent application Ser. No. 12/939,112 referenced before, and use the ASM to build several other desirable graphs or maps. One of the desired maps in this application would be a map or a plan or a route that can show the relations between the OSs of the body of knowledge based on the "most significant associates (MSA)" which in turn can be based on their value significance and their strength of associations to each other. Such map or route can be followed by the composer module to make sure that the generated composition is coherent and sensible and represent the same essence of knowledge as the input body of knowledge. Therefore as shown in FIG. 1 a principal map can be obtained or envisioned from which a composing backbone route or principal route is selected according to the method and algorithm that will be explained by referencing to FIG. 2, $a$, and $b$ of this application. The principal route can also be derived from the ASM directly as exemplified in the method shown in FIG. 3.

Also shown in the FIG. 1, is the composer block or module that composes a new composition by assembling the scored partitions of the body of knowledge based on the VSMs of the partitions according to the backbone or the principal route/s, and by using the participation information of the partitions into each other. The composer further might have several other predetermined criteria that should be considered in composing the output composition. Such criteria could be the length or percentage ratio of the generated composition relative to the given BOK, or the style, the type of substance (verified or novel), etc. The new composition will be usually composed or built as a summarization of the body of knowledge, a general overview or complete overview of the body knowledge, or novel aspects of the BOK.

The advantage and value of such new composition is that important partitions having significant value in the body of knowledge are identified and recomposed in a systematic and logical manner which can be automated while it is readable and comprehensible by a human consumer. Moreover and more importantly the generated composition will not overlook important issues unlike a human composer. A human composer can easily get confused and lose the main points due to the sheer volume or diversity or size of the information or the knowledge embedded in the body of knowledge.

The aim is to have a much cleaner and logical view of the body of knowledge in a much shorter and structured compositions so that a consumer can save lots of research and trial times and making sure that the user has access to the most valuable knowledge related to his/her subject matter/s of interest. The new compositions, or the system which in fact could be used as a tool for knowledge seeker, may be named as an answer, a summary, an essay, a response, a report, a content etc. and be used in variety of situations depend on the output length of the generated composition.

Figure 2A:
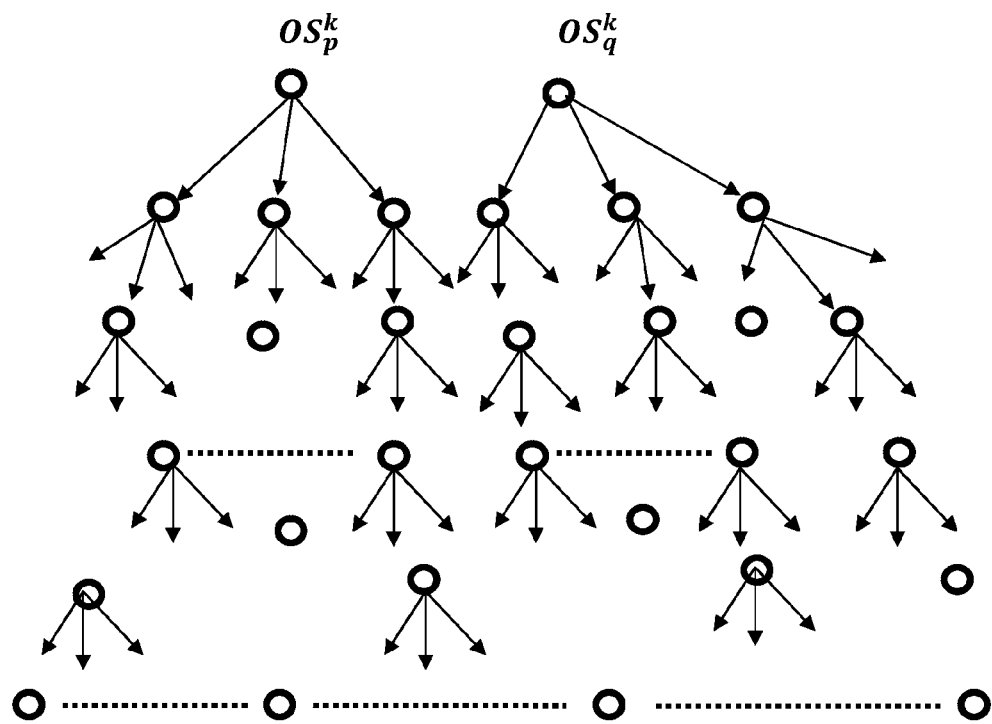
FIG. 2a: shows conceptually a principal map of the Body Of Knowledge (BOK), according to one exemplary embodiment of such a map or graph.

Referring to FIG. 2a now, it shows one exemplary principal map of the knowledge of the input body of knowledge which can be formed, as one example, using the following protocol:
1. from the ASM calculate one of the VSM measures (VSM2 or the ASN for instance is good quality value measure) for an initial set of OSs of interest from the BOK,
2. select a first set of OSs, having one or more member and poses the most significant value from said original set regarding a predetermined aspect, represent said first set of OSs in the first layer of tree like graph or map, as shown in FIG. 2a, as first layer nodes,
3. identify a desired number of most significant associates (MSA) (having for instance the highest association strength) of each member of said first set of OSs, which form the second set of OSs and are represented by corresponding nodes in the second layer; and
4. repeating step 3 for said second set of OSs and represent them as nodes of the graph in the third layer, $4^{th}$ layer and so forth until predetermined criteria such as number of layers, number of total nodes, minimum strength of the edges between each two nodes, and the likes are met.

FIG. 2a, shows one exemplary embodiment of principal map that can be driven from the ASM matrix. The principal map can further be refined with more restrictive predetermined criteria to be used as the route or the plan for composing the new content composition. The refined map is called "the principal or backbone route" or "composing plan" here.

Figure 2B:
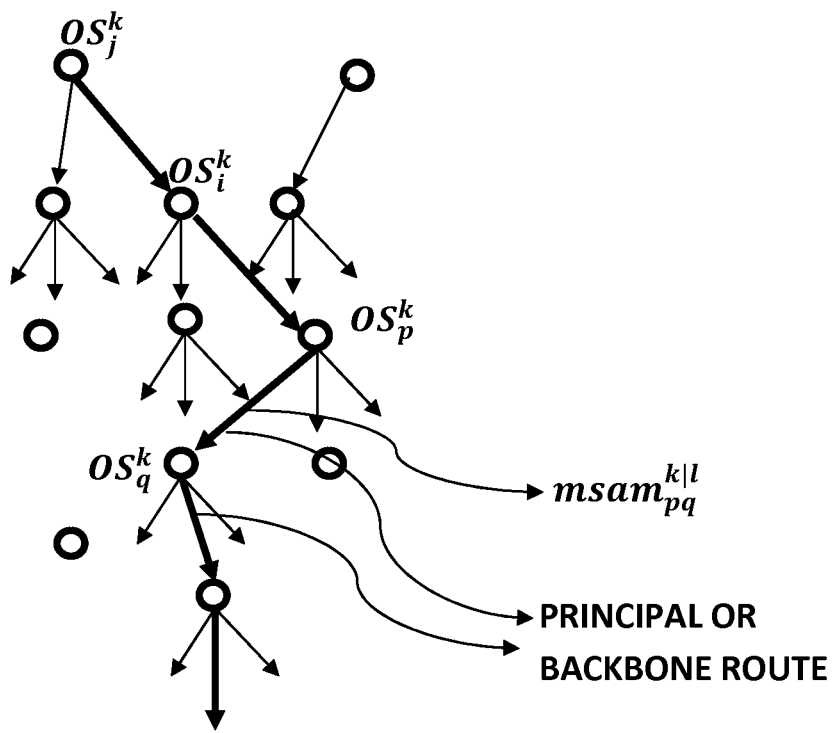
FIG. 2b: shows a principal route for composing content according to one exemplary embodiment.

FIG. 2b, shows one more exemplary principal route or composing plan or route. In this embodiment the principal route is the route of the strongest association to its above layer associates. The thicker line route is one exemplary principal or backbone route and is determined by:
1. selecting at least one OS or node from the first layer,
2. selecting at least one OS from the next layer having the "Most Significant Association (MSA)" with said selected OSs of the first layer, and connect the first layer OSs with the most significant association, e.g. strongest association, in the second layer, and
3. repeat the step 2 for the most significant associates of the first layer, to find the most significant associates of the second layer to form the third layer and so on or until a predetermined criteria is met.

The actual depictions of the graphs are not necessary for composing the new composition. Moreover the backbone route can directly be derived from the ASM or other derivative matrices. The graphs are to demonstrate that there is more than one way to compose the composition after having the ASM and/or the VSMs of the ontological subjects and/or partitions of the body of knowledge. FIGS. 2a, and 2b are just two exemplary reasonable maps that can be useful and insightful.

Figure 3:
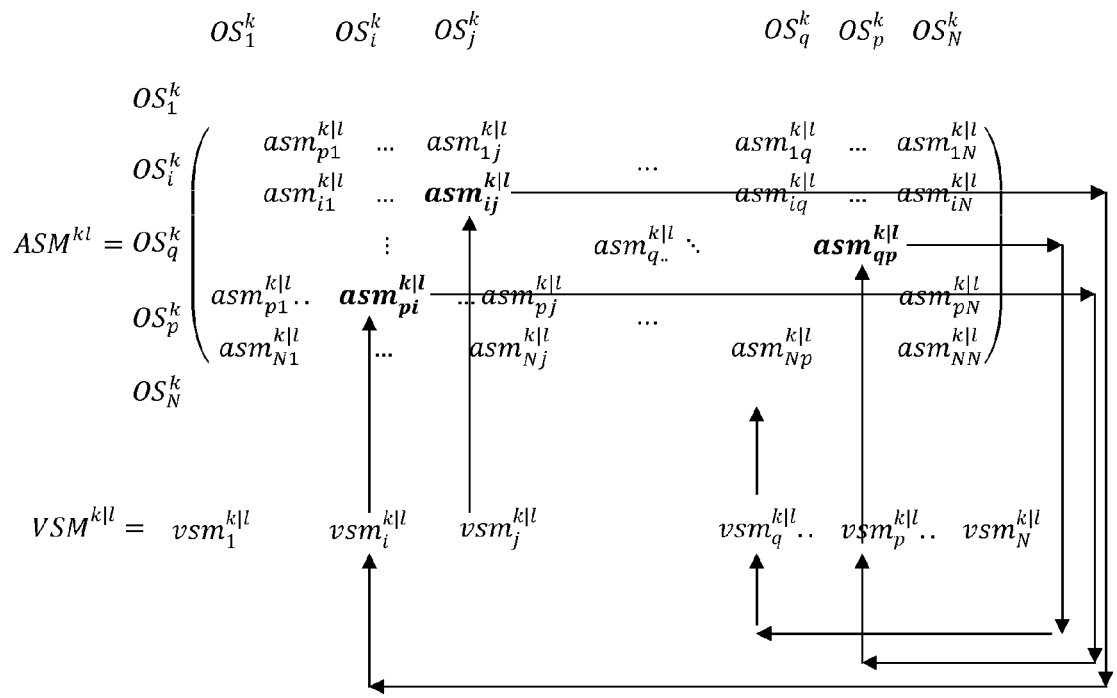
FIG. 3: shows one exemplary process of finding the most significant associates (MSA) using only the association strength matrix (ASM).

FIG. 3 shows one actual exemplary selection process and the algorithm of finding the nodes of principal or backbone route using the ASM and VSM.

As seen in this exemplary embodiment we start with the most valuable OS of order k of the composition whose value is shown as $vsm_j^{k|l}$ in FIG. 3 which is corresponded to $OS_j^k$, looking into the jth column of the ASM find the most significant associate/s to the $OS_j^k$, (in this example the one that has highest asm in column j) which in this embodiment is assumed to be $OS_i^k$, and then come back to the ith column of the ASM and find the most significant associates (the one that has highest asm in column i of the ASM) which is assumed to hit $OS_p^k$ as shown in FIG. 3, and then find the strongest associate for $OS_p^k$ which was found to be $OS_q^k$, and so on. Obviously more parameters such as VSMs of the ontological subjects can also be considered beside the association strength in forming a decision regarding the selection of the OSs of the composing route.

In this way we can make a list (or an ordered set) of the $OS^k$ (nodes) on the backbone or composing route which is shown in the FIG. 3, as "Composing Route Nodes (CRN)" or the vector, or the list or the set which is denoted by $CRN^{k|l}$ in FIG. 3. The composer can start from the first two or more of the OSs in the $CRN^{k|l}$ and find the partitions (simply by doing an AND operation of the corresponding rows of the OSs of $CRN^{k|l}$ in the PM) that contain the selected OSs in the list of $CRN^{k|l}$. From these set of partitions (i.e. first selected set of $OS^l$ s) then select a desired number of them based on their value significance (i.e. $VSM^{k|l}$ in Eq. 5) for inclusion in the new composed content. Again the same process can be done for the second group of two or more OSs of $CRN^{k|l}$ (e.g. just by shifting the index in the list) and find all the desired partitions as the ingredients of or the constituent semantic parts of the new compositions.

It is noticed that various other ways of composing a new content composition can be devised without departing from the scope and spirit and the teachings of the invention. For example, the process can also be done dynamically in such a way that finding or selecting an OSs for inclusion the composing route and then find the candidate partitions for inclusion in the new content composition and then move on to finding the next OSs of the composing route and repeating the process until certain criteria are met.

In general, unless looking for a specific part of the map, the route usually starts form the highest valued (having the highest VSM regarding the important aspects of the parts of the BOK) in the first level or layer and pass through the most significant associates of each of the OSs of the earlier layer. The most significant associate can mean the OS that has the highest association strength or those associates that have highest VSM, or any desirable function of the association strength and VSM. In general the "Most Significant Associates of $OS_i^k$ ($MSA_i^{k|l}$)" can be given by a set or a vector:

$$MSA_i^{k|l} = f(asm_{ji}^{k|l}, VSM_j^{k|l}) \geq \gamma \text{ and } j=1,2 \ldots N \quad (6),$$

where $f$ is a predefined function and $\gamma$ is a predetermined value employed here as a threshold. Collection of the MSA for all the OSs can again be represented by a matrix called "Most Significant Association Matrix (or $MSAM^{k|l}$)" for which the $MSA_i^{k|l}$ is the ith row. The edges of the graph between each two nodes of the principal route therefore can be obtained from $MSAM^{k|l}$, e.g. as shown in FIG. 2b, the edge between the node $OS_p^k$ and $OS_q^k$ is denoted by $msam_{pq}^{k|l}$.

In other words, generally, the principal or backbone route can be identified from $MSAM^{k|l}$, which is based on the predetermined form of the function $f$ in Eq. 6, and the desired number of nodes in the principal route or any other constraint on the value of the elements of $MSAM^{k|l}$.

Many different composing routes or backbones can be devised, selected or identified based on the desired form and application of the generated content. For instance, criteria for the desired content could be to have information about the relations of the OSs demonstrating a predetermined range of association strength to each other or to one of most valued OSs. The final generated content could be a simple answer about a subject matter, a summarization of BOK related to a subject matter, a tutorial paper about the subject matter, background information content, or contains novel information of the BOK of a subject matter. For instance, a novel content can mostly include the less known (having lower VSM) OSs in the BOK but, optionally, with strong association to high valued OSs. For example to emphasize on the novel aspects of the BOK one can use the following VSM for $OS_i^k$:

$$VSM6_i^{k|l} = \log_b \text{iop}_i^{k|l} \qquad (7)$$

wherein b is the logarithm base that one can choose b=2 for familiarity and convenience. This value significance ($VSM6_i^{k|l}$) is in fact a function of $VSM1_i^{k|l}$ that magnifies the novelty of an OS (e.g. the $OS_i^k$) in the value significance of the partitions. The $VSM6_i^{k|l}$ also may be called the self-information of $OS_i^k$. The partition containing more of $OS^k$ of high $VSM6^{k|l}$ scores high in regards to the novelty aspect of a partition of the BOK.

However, optionally the scores of the partitions based on the VSM of the choice can further be scaled or normalized when it is more appropriate. For instance the score or the resultant VSM of a partition (i.e. the resultant $VSM6^{l|k}$ from Eq. 5) can be divided by the number of the $OS^k$ contained in the partition or by the total number of the characters used in the partitions etc. in order to have a fair comparison of the merits of a partition among a set of partitions of the BOK.

In another aspect one may want to select the partitions of substance and novelty for inclusion in the generated composition and therefore she/he might yet define another VSM to be used for evaluation of the partitions as the following:

$$VSM7_i^{k|l} = \alpha_1 VSM2_i^{k|l} + \alpha_2 VSM6_i^{k|l} \qquad (8)$$

wherein $\alpha_1$ and $\alpha_2$ can be some preselected constants. This value significance ($VSM7_i^{k|l}$) is in fact a function of $VSM2_i^{k|l}$ and $VSM6_i^{k|l}$ (i.e. a function $VSM2_i^{k|l}$ and $VSM1_i^{k|l}$) that can be used as a balance measure of substance and novelty of the partitions of the BOK employing Eq. 7. Or one may find a VSM function in the following form be more appropriate for her/his type of application:

$$VSMx_i^{k|l} = \text{iop}_i^{k|l} \cdot \log_b \text{iop}_i^{k|l} - \log_b \text{iop}_i^{k|l} = -\log_b \text{iop}_i^{k|l}(1 + \text{iop}_i^{k|l}) \qquad (9)$$

Obviously numerous other value significances or combinations of them can be defined and introduced by those skilled in the art without departing from the scope and spirit of this invention. Depends on the application's aspect, and as mentioned in the patent application Ser. No. 12/939,112, various "value significance measures (VSMs)" can be defined as functions of other VSMs to serve the desired style, aspect, and purpose of the content composition generations. These VSMs play a role in filtering or selecting the most suitable parts or partitions of the composition (e.g. words, sentences, paragraphs, webpages, and documents.etc.) based on and for the desired application/s or goal/s.

Also although in this preferred exemplary embodiments we use the ASM to identify the route/s and map/s, other forms of association or any measure of significance of the associations between OSs of the BOK can be used to construct and identify the backbone rout, or the composing plan. For instance an Ontological Subject Map (OSM) introduced in the US patent application entitled "System and Method of Ontological Subject Mapping for knowledge Processing Applications" filed on Aug. 26, 2009, application Ser. No. 12/547,879, can be used. Generally any form of graphs representing the body of knowledge, such as semantic networks or maps, social networks, ontology databases, ontology trees, and the like, can be utilized for identification of a principal, backbone, or composing route.

Figure 4:
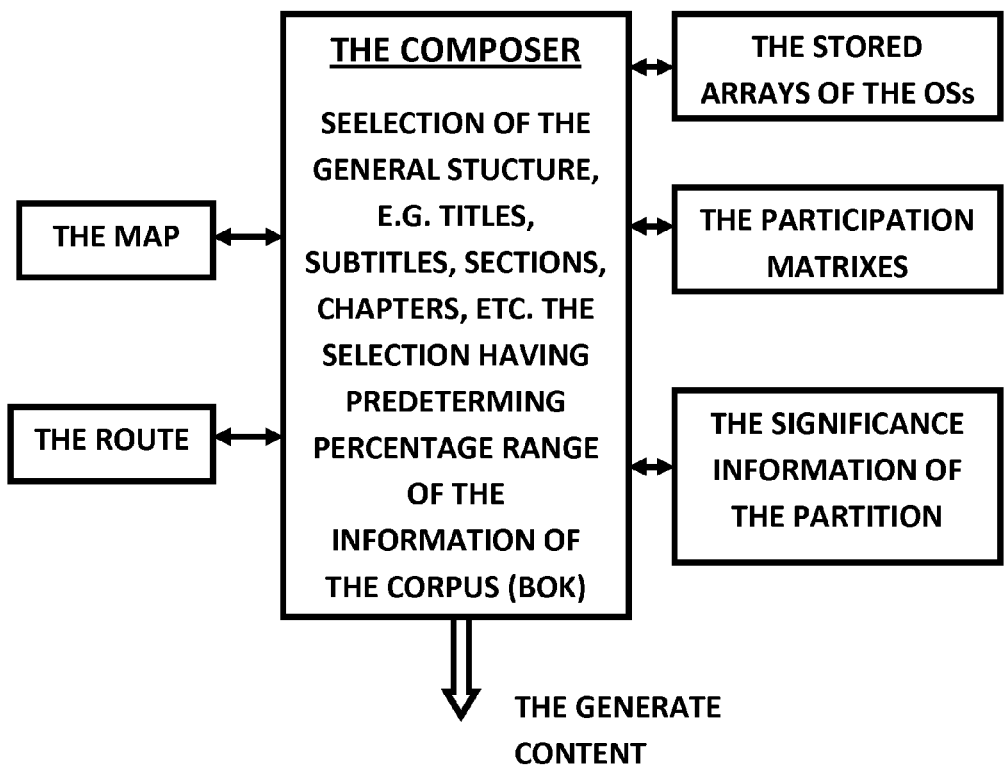
FIG. 4: shows schematic block diagram of content composer in general.

Referring to FIG. 4 now, it shows the composer in more specific but general details. It shows an exemplary way that the composer performs and composes a content form the partitions of the BOK. This is one exemplary embodiments and protocols of using the contents of BOK and the derived data from the BOK to generate a new composition of content from the BOK.

The system can have a plurality of format for generating content. In one exemplary and important case assume the composer is designed to produce an authoritative article or content about the principal subject matter of the BOK.

So such a content or article needs a title and several sections such as "Introduction" or background along with a number of sections presenting enough information about the most important aspects of the subject matter of the title.

So one exemplary protocol for composing such an authoritative article in two general cases devised or can be considered here are:
1. The subject matter of interest is known and we assembled a number of related content to this subject matter and have a body of knowledge about the subject but it is not well structured and dispersed or simply it is too long to be handled by human.
2. There is a body of knowledge and we do not know what is it all about?

For both cases, the system will follow the method and teachings of the current invention to extract the partitions (OSs) of the BOK, make an association strength matrix for the desired OSs (usually the words or phrases used in the BOK) and have identified the backbone rout and have obtained at least one VSM (value significance measure) for the desired OSs with the desired orders (usually the words and sentences or the paragraphs of the BOK) and have arrays or lists of the OSs of the different order in data base (temporary or more permanently) and the PM information. Now the system and the composer will perform the followings:

identify the most significant OSs, e.g words or $OS^1$, of the BOK by looking at the VSM (for instance the one which has the highest association strength number. i.e. ASN as defined in the application 61/259,640, and consider the most significantly valued OS as the main subject matter of new composition.

If there are more than one OSs that have very close VSM the subject matter can contain either one of them or any combination of them.

if the identified subject matter by the system is not the same as subject matter for which the BOK has been labeled (case 1 above), then consider said labeled subject matter as the main OS in the first layer of principal map and proceed to next steps.

Identify the most significant sentence or statement from the array of stored $OS^1$s containing the identified most significant OSs or the subject matter, by looking at the PM and VSM for the sentences (that can be calculated by employing Eq. 5), use this statement as a title, or simply put the subject matter/s as the title. The title can include more than one subject matter.

For the introduction section, from the ASM or principal map or backbone route, identify the most significant associates (MSA vector of Eq. 6) of the subject matter or the title, and find a desired number of sentences from the stored arrays of the $OS^2$s of the BOK (i.e the sentences) which contain the subject matter and at least one or more of the most significant associates of the subject matter.

Then after the introduction section, several following sections will be added. These sections follow the backbone route and include the most valuable partitions of the BOK that explain a relationship between the most significant associates of that layer of principal route. That means identifying the partitions that contain one or more of the associates of the associates of the subject matters or any combination of them and include them in the current section at the predetermined place. Moreover, for example, each important section can have a title (e.g. that indicate one of the most significant associates of the subject matter alone or in conjunction with the subject matter), and there could be assembled one or more paragraphs, composed of one or more sentences, which contain at least one OS from title of the section or its most significant associates. These sentences (or the paragraphs) can be identified, (by identifying their index) from the $MSA_i^{1|2}$ (or $MSA_i^{1|3}$) vector of each $OS_i^1$, then from the PM find the partitions that they have been appeared together and by looking at their VSM of the sentences (or paragraphs), select the desired number of high value sentences/paragraphs that contain the associate of $OS_i^1$'s and then retrieve them from the stored array of $OS_j^2$s (or $OS_j^3$) of the BOK.

The procedure can be repeated for different branches of the backbone route without departing too far from the principal or backbone route. Many measures of distance and metrics can be defined to show the relevance and closeness of the selected partition in each of the section to the backbone route. That will guarantee certain level of coherency and semantic relevance in the generated content.

Furthermore each section and sub-section can have a localized composing plan of its own. For instance in the Introduction section it can be regards as an smaller content that its structures and criteria are different from other subsections explaining the details about the most significant associates of the subject matter and so on.

The block diagram of FIG. 4, is intended for its generality and illustration and should not be interpreted as the only way of composing content or as limitations to the composing methods disclosed herein. Those familiar with the art may devise other methods and systems of building the composer with fewer steps and different complexities without departing from the scope and spirit of this disclosure that is emphasized in generating new composed contents from a body of knowledge. The body of knowledge and or collection of composition in particular may include multimedia content, Unicode strings, mathematical formulas, pictures, figures, data files etc.

Furthermore, in case one above (case 1) the subject matter can itself be a lengthy content, or the subject matter could be extracted from content given by a user/client. For instance a user can input or give the address to a content (e.g. a webpage) and would like to have further investigation into this content by using the method. Alternatively the system can extract the subject matter/s of the given content and assemble related body or bodies of knowledge and then perform the method of content composition.

Figure 5:
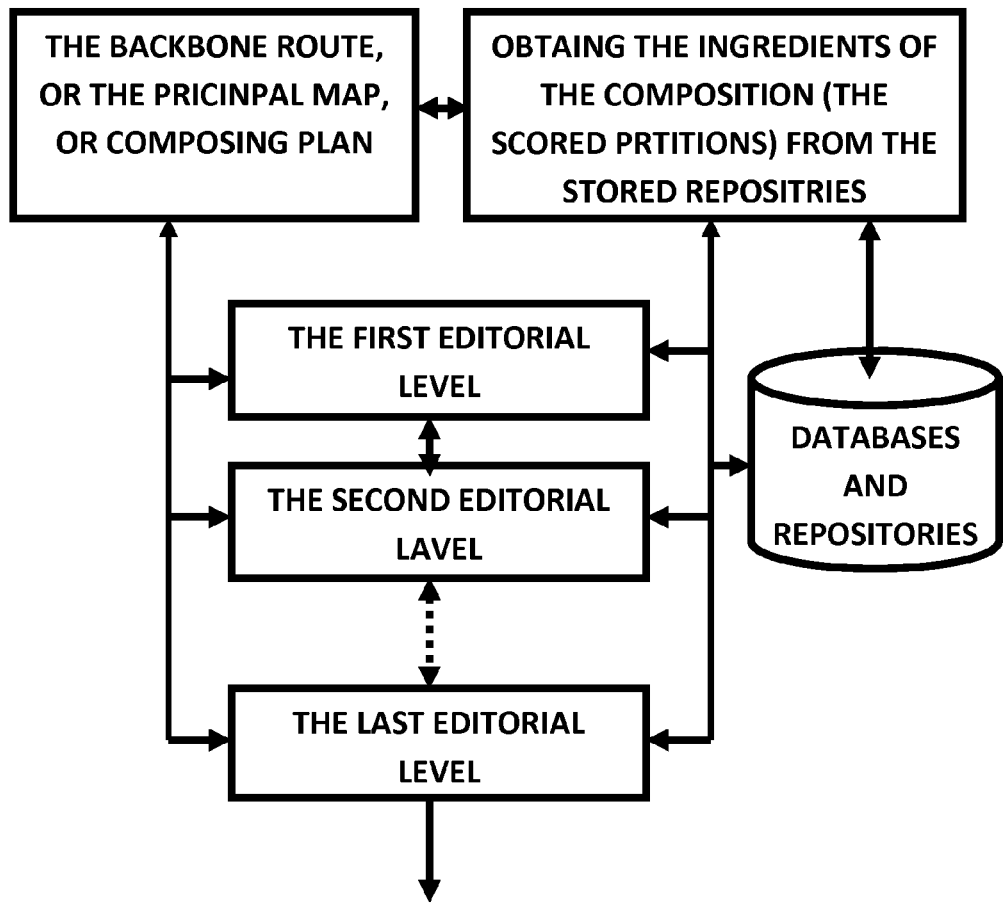
FIG. 5: shows schematics of one optional addition to the composer of the FIG. 4, having different layers of editorial blocks.

Referring To FIG. 5 now, it show that the composer can further have several layers of editorial blocks that is responsible to make the generated content yet more readable, useful, coherent and semantically and syntactically correct, that can adequately represent the most important desired aspects (background, novelty, all the most significant subject matters etc.) of a BOK. As shown the editorial levels use the backbone route, (or can make yet a new route, considering the raw composed content as an input composition) and the retrieved selected partitions for the inclusion in the generated content, to make sure that the desired standards of syntactical and graphical appearances etc. are met.

Other checking measure of quality and substance can be devised and added to the composer for better quality of the composed content. Alternatively the content composing can be done with more than one iteration until certain measures of quality and knowledge substance are met. The preferred method and algorithm will depend on the processing power and the recourses available for implementing the method and the algorithms. For instance the generated content can again be analyzed and its principal map be compared against the principal map of the original body of knowledge. Or VSM spectrum of the generated content is compared to that of the BOK. However, the automatically generated content composition may also be further edited by human operators and editors for final quality check.

Moreover, many other quantitative measures of a quality of the generated content can be devised without departing from the scope and spirit and goal of the current invention. For instance one can measure the real information of the BOK (using for instance the "differential conditional entropy measure" introduced in the patent application Ser. No. 12/939, 112) and that of the generated content etc. for comparison.

It is worth mentioning that the method of generating content compositions according to this disclosure and the accompanying references, will present the most credible and valuable parts of the body of knowledge (in regards to the desired aspect/s of the partitions) and therefore the generated contents will pose a high level of confidence in accuracy and substance.

Figure 6:
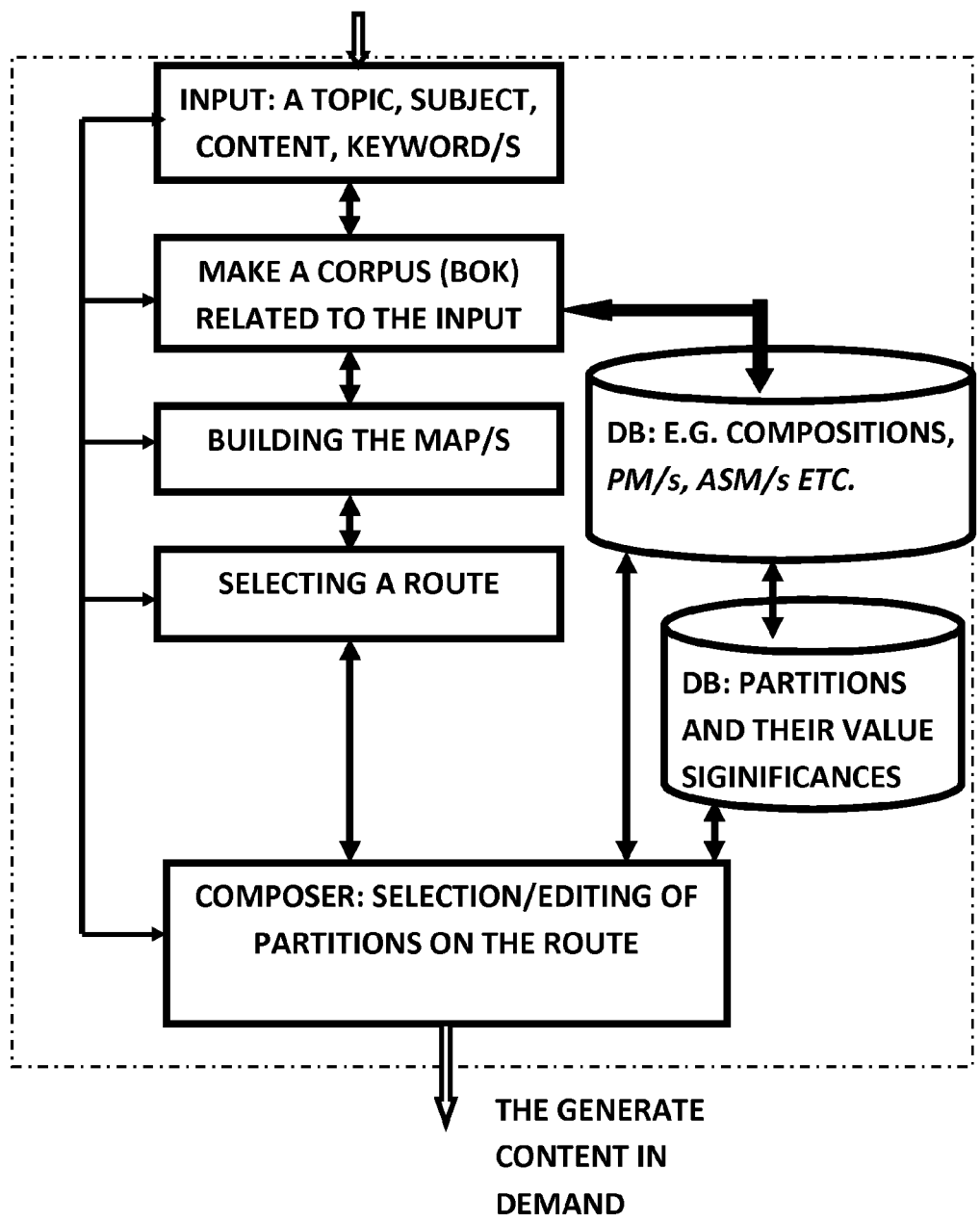
FIG. 6: shows the composing of content in demand or in response to a requested subject matter.

Referring to FIG. 6 now, it shows an important application of the method and the system of automatic content generation from a body of knowledge in response to a user's request. The system of FIG. 6 will assemble a body of knowledge for the client or user and then generates the requested form of the content with the predetermined or optional formats for the user.

The user's request can be a keyword, a question posed in natural language, or in general any content short or long. The system may first extract the OSs of the input request and find the keywords from the input request and assemble a BOK that is related to these keywords. Consequently as shown in FIG. 6 by following the method and algorithms of this application provide the desired content in the from of an answer, a coherent summarization of the assembled BOK, a content explaining the novel aspects of the keywords in the context of the assembled BOK, a tutorial content, and the like, to provide an answer as a service to the user's request.

The input request can further be an existing content such as paper, a webpage, or a pre-built body of knowledge for which a user wants to have a composed content or like to have further investigations in a larger scale of related knowledge and information. In this case a user can request a service for investigating the submitted paper or the content and demand a report of the investigation from the system in variety of forms such as the merit of the submitted content in comparison to larger body of knowledge in the same field or context. Or demand an authoritative report or summary or an essay regarding and related to subject matter/s of the submitted content etc. Those skilled in the art can envision various applications and further modes of operation for the system and methods disclosed here without departing from the scope and spirit of the invention.

Figure 7:
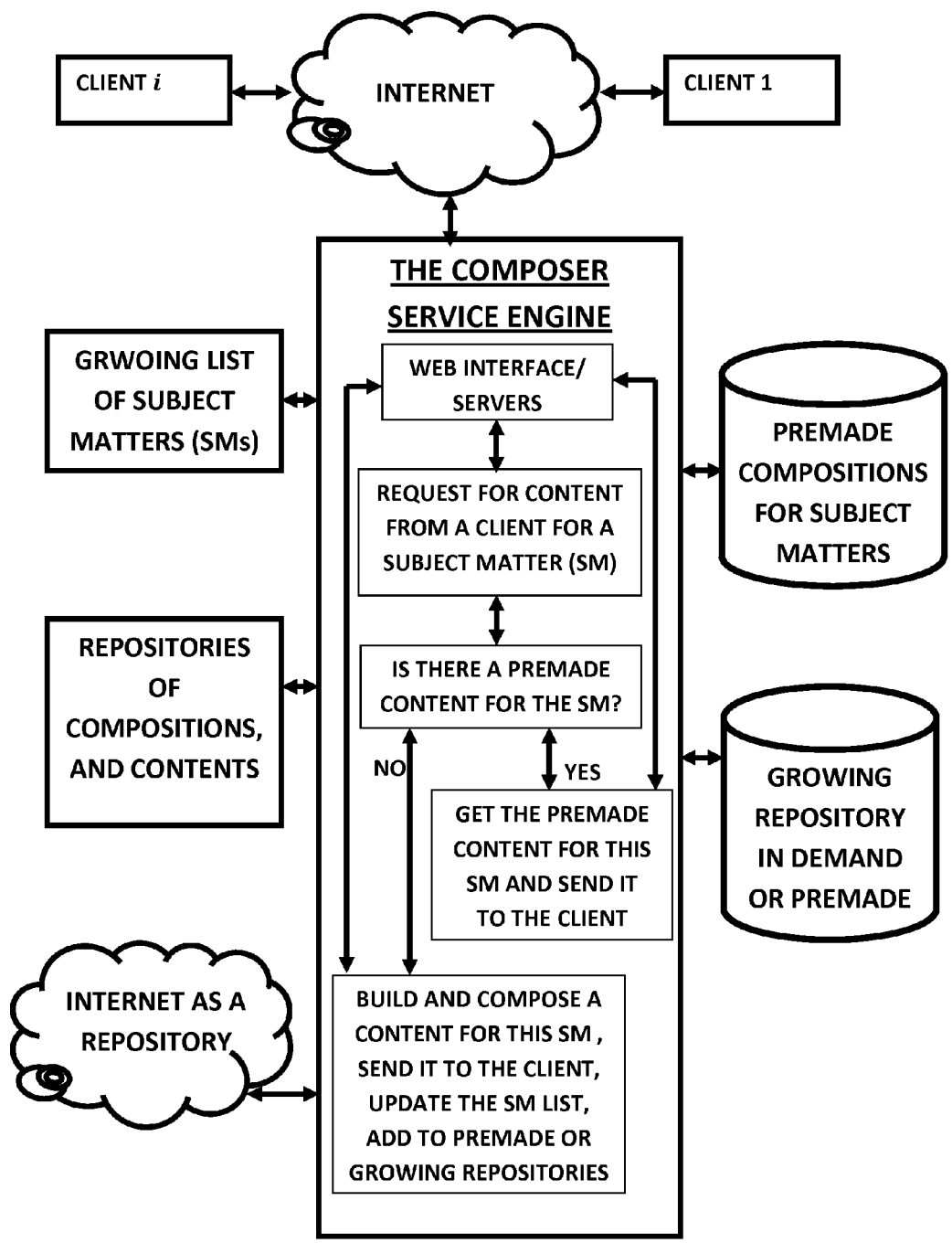
FIG. 7 shows one exemplary schematic of a web service system having hardware and the embedded software and codes for providing content to users upon request.

FIG. 7 shows, an exemplary application system and/or an online service provider system in which there are provided the web service appliances in the forms of storage, servers and software, and hardware that may contain pre-generated content for a list of subject matters and stored them for easy retrieval in response to a user's request for content or will create a content composition in response to a client input. The building blocks of the composer service engine are explained in the FIG. 7 itself.

Referring to FIG. 7, for instance if the system has had generated content for the subject matter of the client's request, then it will return the premade content related to the subject matter of the client's request. If the system does not have the requested content or not in accordance with the requested format, then it will generate content with the desired format using the methods and systems of composing new content of the invention and by having access to repositories of knowledge, and information. The repositories of knowledge and information can be the available databases, corporate database/s, a publisher content collection, in-house repositories or otherwise, such as database of a search engine, or the whole internet. It also can include all types of different information representations such as multimedia.

The system repositories of the premade content can further be classified under different subject matters, keywords, or possible on line journals, encyclopedias, wiki groups and the like. The system can at the same time work real time to constantly incorporate the latest findings in a body of knowledge related to a subject matter and modifies the generated content to reflect the latest findings, or add more contents to its repositories. Furthermore the system can analyze a submitted content or body of knowledge by a user, or expand the content or the submitted body of the knowledge and generate new content compositions of requested formats, style, substance etc in demand.

In conclusion, in this disclosure it is noticed that a document representing the collective knowledge of a diverse set of compositions containing information about a topic should first of all cover the most important aspects of the topic and its associated subtopics. Secondly it should contain the information according to the state of the collective knowledge and understating of the mass about that topic. Thirdly it should follow a logical path toward connecting the information about the knowledge therein so that it is easy for human to comprehend and follow the relations between the most important parts of knowledge describing or analyzing or supporting a topic.

Moreover, the methods, algorithms, and the systems disclosed in this application propose a great benefit to the knowledge professional and knowledge seekers so as to shorten their research time significantly while the generated content according to the teaching and the systems and services proposed in this applicant can give them valid account of a body of knowledge, without bias, overlooked facts, limitation on the subject matters, language, or compromise on the quality of knowledge. An important advantage of the methods disclosed herein that they not relay on the individual semantic or syntactic symbols and/or terms of the composition in order to provide a satisfactory service. The systems, methods and algorithms explained here, are expected to accelerate the rate of knowledge discovery significantly, and make the task of learning and knowledge acquisition, research, and analysis of the knowledge and information much more efficient and effective.

It is understood that the preferred or exemplary embodiments and examples described herein are given to illustrate the principles of the invention and should not be construed as limiting its scope. Various modifications to the specific embodiments, formulations, and algorithms could be introduced by those skilled in the art without departing from the scope and spirit of the invention as set forth in the following claims.

What is claim is:

1. A computer implemented method of generating content composition comprising:
   accessing, using one or more data processors or one or more data storage mediums, a body of knowledge;
   extracting one or more pluralities of ontological subjects of predefined orders from the body of knowledge;
   calculating significance values for one or more pluralities of ontological subjects of predefined orders participated in the body of knowledge; said significance value is a function of one or more value significance measures;
   calculating association strengths between some of ontological subjects of at least one predefined order of the body of knowledge;
   identifying at least one composing route or map based on said calculated association strengths or the significance values of some of said ontological subjects of the body of knowledge
   selecting one or more partitions of the body of knowledge according to at least one of said at least one composing route or map and assembling a content composition.

2. The computer implemented method of claim 1, wherein the body of knowledge is partitioned to a plurality of partitions; assigned with a predefined order; and one or more of said partitions are decomposed to their constituent ontological subjects having other predefined order than the partitions.

3. The computer implemented method of claim 2;
   wherein the composing route or map is identified based on a function of one or more quantities respective of one or more of the followings:
   co-occurrence numbers of said other predefined order ontological subjects;
   association strengths of said other predefined order ontological subjects;
   probability of occurrences of the other predefined order ontological subjects of the body of knowledge;
   value significances of the other predefined order ontological subjects; and
   value significances of the partitions of said body of knowledge;
   frequency of occurrences of ontological subjects of predefined order.

4. The computer implemented method of claim 3;
   wherein the composed content includes at least one partition of the body of knowledge having significance value of a predefined range and includes one or more ontological subjects from:
   the ontological subjects on the composing route;
   associates of the ontological subjects of the composing route.

5. The computer implemented method of claim 2;
   wherein one or more constituent ontological subjects of the partitions are replaced with other ontological subjects.

6. The computer implemented method of claim 2;
   wherein the composed content is about one or more of ontological subjects.

7. The computer implemented method of claim 1;
   further comprising: assembling a body of knowledge for one or more of ontological subjects of a set of ontological subjects of predefined order.

8. The computer implemented method of claim 1; further comprising:
   assembling a body of knowledge for a given content.

9. The computer implemented method of claim 1;
wherein the composed content further is edited by one or more of:
a computer implemented program comprises instructions that; when executed by one or more processing device; cause to display one or more editorial environments;
a computer implemented program comprises instructions that when executed by one or more processing device; cause to perform:
identifying at least one composing route;
rearranging at least one of the partitions of he composed content based on the at least one composing route; and making a composed content;
a computer implemented program comprises instructions that when executed by one or more processing device; cause to perform:
assembling a body of knowledge for the composed content;
identifying at least one composing route or map;
selecting and rearranging at least one of the partitions of he composed content or the assembled body of knowledge based on the at least one composing route or map; and making a composed content.

10. At least one non-transitory computer-readable storage medium having computer-executable instructions stored thereon that;
when executed by a system having at least one processor; cause the system to perform a method comprising:
accessing a body of knowledge;
calculating significance values for one or more pluralities of ontological subjects of predefined orders participated in the body of knowledge; said significance value is a function of one or more value significance measures;
calculating association strengths between some of ontological subjects of at least one predefined order of the body of knowledge;
identifying at least one composing route or map based on the calculated significance values or said association strength of some of said ontological subjects of the body of knowledge;
selecting one or more of partitions of the body of knowledge according to at least one of said at least one composing route or map.

11. A system of providing at least one service over a data network comprising:
one or more communication devices;
at least one set of instructions stored in a memory and executed by a processor cause to create an environment for obtaining a data;
at least one module stored in a memory and executed by at least one processor; cause the system to access at least one content; said at least one content is provided by the at least one module cause the system to perform:
accessing at least one body of knowledge;
selecting at least one set of ontological subject of a first predefined order;
partitioning the body of knowledge into one or more pluralities of partitions;
estimating the frequency of occurrences of some of said ontological subjects of first predefined order;
estimating the frequency of co-occurrences of one or more pairs of said ontological subjects of the first predetermined order;
calculating association strength between one or more pairs of ontological subjects of the first predefined order as a function of their co-occurrences and zero or more of the frequency of occurrences of the ontological subjects of said one or more pairs;
calculating a significance value for one or more of said ontological subjects of the first predefined order or said partitions of the body of knowledge;
building one composing route or map based on the calculated association strengths or said significance values of some of said ontological subjects of the body of knowledge;
composing a content from one or more partitions of the body of knowledge according to at least one of said at least one composing route.

12. The system of claim 11; wherein the body of knowledge is accessed based on the obtained data.

13. The system of claim 11; further comprising a set of instructions that when executed by a processor cause to send the composed content over the network.

14. The system of claim 11; wherein said body of knowledge contains one or more news content.

15. The system of claim 11; wherein the network is the internet.

16. A system for providing a service to a client comprising:
one or more data input/output devices;
computer programming instructions for providing access to at least one processing device and/or at least one computer-readable storage medium over a first network;
computer programming instructions for facilitating access to at least one content; said at least one content is an output of at least one software module comprises instructions executed by one or more processing devices over a second network to perform:
accessing to at least one body of knowledge;
selecting one or more pluralities of ontological subjects of predefined orders from the body of knowledge;
calculating significance values for one or more pluralities of ontological subjects of predefined orders participated in the body of knowledge; said significance value is a function of one or more value significance measures:
calculating association strength between some of ontological subjects of at least one predefined order of the body of knowledge;
identifying at least one composing route or map based on one or more said calculated association strengths or significance values of some of said ontological subjects of the body of knowledge
selecting one or more partitions of the body of knowledge according to at least one of said at least one composing route.

17. The system of claim 16; wherein the first network or the second network is internet.

18. The system of claim 16; wherein the first or the second network is a cloud computing network comprising: one or more processing devices; at least one computer-readable storage medium; and one or more communication devices.

19. The system of claim 18; wherein at least one of the processing device or at least one of the storage medium is located in geographically different location than the rest of the system.

20. The system of claim 16; wherein further includes one or more computer-readable storage media; over the first or over the second network; to store one or more of the followings:
at least one composition as a body of knowledge;
at least some of the partitions of at least one composition;
at least some ontological subjects of predefined order;

at least one set of data respective of one or more composing routes;

one or more index lists of ontological subjects of one or more predefined orders of a composition;

at least one pre-made content composition from a body of knowledge.

21. The system of claim 16; further configured to provide an environment for a client to input a request for service.

22. The system of claim 21; wherein a content composition is assembled by said provider of the service in response to the client's input.

23. The system of claim 16; wherein the first and the second network form a single network or are parts of a larger network architecture.

24. A system for providing a service to a client comprising:
one or more network communication devices for receiving electrical signals initiated from a client over a communication and/or computer network;
one or more communication devices for exchanging data signals with at least one computer system;
at least one computer system comprising at least one non-transitory computer-readable storage medium and at least one processing device; exchanging electrical signals initiated from a client over a communication computer network; executing the instructions of at least one computer program embedded thereon; said computer program when executed by the at least one processing device cause to output a content composition comprising:
accessing to at least one body of knowledge;
selecting one or more pluralities of ontological subjects of predefined orders participated in the body of knowledge;
assigning significance values to one or more pluralities of ontological subjects of predefined orders participated in the body of knowledge; said significance value is a function of one or more value significance measures;
calculating association strength between some of ontological subjects of at least one predefined order of the body of knowledge;
identifying at least one composing route or map based on one or more said calculated association strengths or significance values of some of said ontological subjects of the body of knowledge;
selecting one or more partitions of the body of knowledge according to at least one of said at least one composing route.

25. The system of claim 24; wherein further includes one or more computer-readable storage media to store one or more of the followings:
at least one composition as a body of knowledge;
at least some of the partitions of at least one composition;
at least some ontological subjects of predefined order;
at least one set of data respective of one or more composing routes;
one or more index lists of ontological subjects of one or more predefined orders of a composition;
at least one pre-made content composition from a body of knowledge.

26. The system of claim 24; further comprising:
one or more computer servers with at least one network communication device for connection to repositories of compositions or partitions of said compositions; said one or more servers comprise or have access to one or more processors;
at least one array of data extracted or calculated based on information respective of participation patterns of a plurality of constituent ontological subjects of one or more compositions into a plurality of partitions of the one or more composition.

27. The system of claim 24; wherein the system is distributed and at least one part of the system is physically located in; or performs from; different location from the rest of the system.

28. The system of claim 24; wherein the system is distributed and at least one of the one or more processors and/or one of the one or more storage media is physically located in; or performs from; geographically different location from the rest of the system.

29. A method of facilitating a service for a client over a communication and/or computer network; comprising:
providing an access for the client over the network;
receiving signals or an input from the client; said input can be used to identify the network address of a provider of said service;
transmitting signals or data to the provider of said service;
facilitating for exchanging signals or data between the client and the provider of said service; wherein said service is performed by at least one computer program; said computer program comprises instructions executable by one or more processors to process a composition and provide one or more of:
one or more arrays of data corresponding to the participation of at least some of the ontological subjects of a first predefined order of the composition into a plurality of ontological subjects of the second predefined order of the ontological composition
at least one non-empty list of value significances of the partitions of the compositions; said value significances are calculated using the data of one or more arrays of data corresponding to participations of at least some of the ontological subjects of a first predefined order of the composition into a plurality of ontological subjects of a second predefined order of the ontological composition;
at least one selected partition of the composition based on the data of one or more arrays of data corresponding to participations of at least some of the ontological subjects of a first predefined order of the composition into a plurality of ontological subjects of a second predefined order of the ontological composition;
at least one content composition containing at least one selected partitions of a body of knowledge according to a composing route; said composing route is a function of value significances or association strengths of one or more of the constituent ontological subjects of the composition; wherein said value significances or association strengths of said constituent ontological subjects are calculated based on the data of one or more arrays of data corresponding to participations of at least some of the ontological subjects of a first predefined order of the composition into a plurality of ontological subjects of a second predefined order of the ontological composition.

30. The method of claim 29; wherein the network is the internet.

31. The method of claim 29; wherein said client is a computer program comprises a set of instructions executable by a computer system over the network; said computer system comprising at least one processing device.

32. The method of claim 29; wherein said provider of the service is at least one computer program comprises instructions executable by a computer system over the network; said computer system comprising at least one processing device.

33. The method of claim 29; wherein said provider of the service provides a response answer which is embedded in computer-readable codes that when executed by a client's computer system the response answer is displayed on the client's display in a dynamically designed format.

34. The method of claim 29; wherein a composition is assembled by said provider of the service in response to the client's input.

35. The method of claim 29; wherein the composition is provided by the client.

* * * * *